J. H. STEPHENS.
HOSE COUPLING.
APPLICATION FILED JULY 8, 1913.
1,171,551.
Patented Feb. 15, 1916.
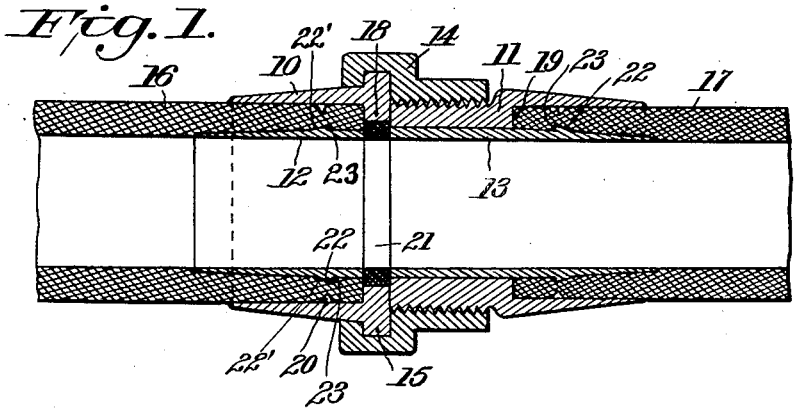
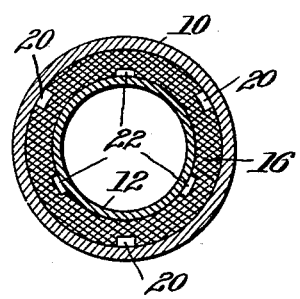
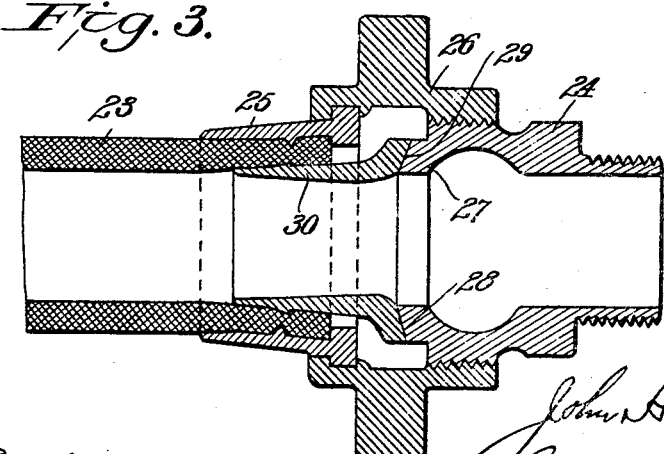
Witnesses
A. I. Riedel
E. E. Alger.
Inventor
John H. Stephens
By
Attorney

UNITED STATES PATENT OFFICE.

JOHN H. STEPHENS, OF VERNON, TEXAS.

HOSE-COUPLING.

1,171,551. Specification of Letters Patent. Patented Feb. 15, 1916.

Application filed July 8, 1913. Serial No. 777,939.

*To all whom it may concern:*

Be it known that I, JOHN H. STEPHENS, a citizen of the United States, residing at Vernon, in the county of Wilbarger and State of Texas, have invented certain new and useful Improvements in Hose-Couplings, of which the following is a specification.

This invention relates to hose couplings. One object is to provide a hose coupling composed of coupling members each having hose engaging lugs into engagement with which the hose sections are adapted to be expanded by thimbles driven into the coupling members.

Another object resides in the provision of a hose coupling composed of coupling members provided with internal short spaced hose engaging lugs into locking engagement with which the hose sections are adapted to be expanded by tapering thimbles preferably driven into the hose sections and which thimbles are preferably provided with spaced exterior lugs adapted to bite into the hose sections from the inner side thereof to reinforce the aforesaid lugs in securing the hose sections in the coupling members and to prevent accidental withdrawal of the thimbles from the hose sections.

A still further object resides in the provision of a coupling member for hose couplings embodying a sleeve provided with internal lugs into locking engagement with which and against the inner surface of the sleeve a hose section is adapted to be explained through the instrumentality of a tapering thimble which is adapted to be driven into the bore of the hose section.

With the above and other objects in view the present invention consists in the combination and arrangement of parts hereinafter more fully described, illustrated in the accompanying drawings and particularly pointed out in the appended claims, it being understood that changes may be made in the form, proportion, size and minor details without departing from the spirit or sacrificing any of the advantages of the invention.

In the drawings:—Figure 1 is a longitudinal section view of one form of the invention. Fig. 2 is a transverse sectional view on the line *a—a* of Fig. 1. Fig. 3 is a longitudinal sectional view of a modified form of the invention.

Referring now to the accompanying drawings and more particularly to Figs. 1 and 2, one form of my improved coupling comprises coupling members 10 and 11 with each of which members coöperates thimbles 12 and 13, respectively. The coupling members may be detachably connected together in any suitable manner, for instance, as illustrated in the accompanying drawings, wherein the nut 14 has swiveled connection with the member 10 over the external annular shoulder 15 and detachable screw threaded connection with the coupling member 11.

The thimbles 12 and 13 are each preferably tapered and are driven into the hose sections 16 and 17 from the inner ends of the coupling members. The outer end of each thimble terminates in substantially a sharp edge so that when the hose sections 16 and 17 are clamped between the respective thimbles 12 and 13 and sections 10 and 11 the interior of the hose may be substantially smooth.

In assembling the parts the hose sections 16 and 17 are fitted in the coupling members 10 and 11 with the inner ends of the hose sections fitted preferably against the annular internal shoulders 18 and 19 of the coupling member. Prior to connecting the coupling member 11 operatively with the coupling member 10 by the nut 14, the respective wedge thimbles 12 and 13 are inserted into the respective coupling members 10 and 11 from the inner ends of the latter. These thimbles being wedge shaped or tapered as shown, a driving of the thimbles in any suitable manner into the bore of the hose sections 16 and 17 causes the hose sections to expand tightly against the coupling members and be clamped tightly between them and the thimbles.

To insure a firm grip of the coupling members 10 and 11 on the outer surface of the hose sections 16 and 17 the coupling members are preferably provided with internal knife edge lugs 20 which are adapted to bite into the rubber hose or other pipe sections 16 and 17 when the latter are expanded by the thimbles as the thimbles are driven into the sections of the hose or pipe. This provides for a firm connection of the hose with the coupling members and when the coupling members are united together by the nut 14 the inner ends of the thimbles bear against a washer or suitable packing 21 to prevent leakage.

To insure against accidental withdrawal of the thimbles 12 and 13 from clamping engagement with the inner surface of the hose sections 16 and 17, I preferably provide the thimbles 12 and 13 on their exterior with a plurality of slightly raised inclined lugs 22, which, owing to their inclined faces 22', permit of the thimbles being driven through the coupling sections and into the hose and yet, by virtue of the shoulders 23 at the rear of the lugs 22, there is little or no danger of accidental withdrawal of the thimbles 12 and 13 from the coupling members or out of securing connection with the hose sections 16 and 17.

From the foregoing it will be seen that I provide a comparatively simple and inexpensive hose coupling and one wherein by virtue of the wedging action of the thimbles 12 and 13 the hose is clamped between the thimbles and the coupling members with the lugs on the inner side of the coupling sections biting into the hose sections. It will also be apparent that these lugs 20 are reinforced by the lugs 22, which do not hinder insertion of the thimbles in the hose sections and yet prevent accidental withdrawal of the thimbles from coöperative binding engagement with the hose sections.

In Fig. 3 there is shown a modified form of the invention. In this instance the hose 23 may be connected up with a hydrant, bib cock, nozzle, nipple or the like 24 by virtue of the hose coupling member 25 having swiveled engagement with a nut 26 which is adapted to screw onto the outlet nipple or the like 24 of the supply. This nipple 24 is preferably provided with an annular seat 27 having an inclined face 28 adapted to be engaged by the inclined seat face 29 on the thimble 30 which latter coöperates with the coupling member 25 to clamp the hose thereon in the same manner that the thimbles 12 and 13 coöperate with the coupling members 10 and 11. The essential characteristics of this modified form of invention reside in the manner of clamping the inner end of the hose in the coupling member and in the forming of a tight ground joint by the inclined surfaces 28 and 29 of the nipple 24 and thimble 30 so as to obviate the necessity of using a gasket so commonly employed and frequently lost in connection with hose now universally used. I therefore provide an efficient ground joint connection which obviates entirely the use of a gasket and I also provide a new and novel means for clamping the hose section in the coupling member as has been explained.

What is claimed is:—

1. A hose coupling comprising coupling members, a clamping thimble in each of said coupling members, each coupling member having spaced internal hose engaging lugs, each thimble having spaced external hose engaging lugs formed with beveled outer ends to facilitate insertion of the thimbles into the hose sections and having perpendicular shoulders at their inner ends to prevent accidental movement outward of the hose sections, the lugs on the coupling members being in transverse alinement with the lugs on the corresponding clamping thimble with the lugs on the coupling members arranged between the lugs on the clamping thimbles so as to clamp the hose tightly between the thimbles and coupling members.

2. A hose coupling comprising a coupling member having spaced internal hose engaging lugs, a thimble adapted to fit within the coupling member to clamp the hose section between it and the coupling member and having spaced external hose engaging lugs formed with beveled outer ends to facilitate insertion of the thimble into the hose section and perpendicular shoulders at their inner ends to prevent accidental movement of the thimble outwardly of the hose section.

In testimony whereof I affix my signature in presence of two witnesses.

JOHN H. STEPHENS.

Witnesses:
 JOHN H. SIGGERS,
 GEO. C. SHOEMAKER.